United States Patent [19]

Crocker et al.

[11] Patent Number: 5,736,602

[45] Date of Patent: Apr. 7, 1998

[54] RETROREFLECTIVE COATING COMPOSITION FOR COIL COATING APPLICATION, METHOD FOR APPLICATION, AND ARTICLES PRODUCED THEREFROM

[76] Inventors: George L. Crocker, 3103 Lakestone Dr., Tampa, Fla. 33618; Rickey L. Beam, 4672 Alabama State Hwy. #67, Holly Pond, Ala. 35083

[21] Appl. No.: 629,788

[22] Filed: Apr. 9, 1996

[51] Int. Cl.$^6$ .................................................... C08K 3/00
[52] U.S. Cl. ........................ 524/494; 523/172; 523/219; 106/31.04
[58] Field of Search .................................. 523/172, 219; 524/494; 106/31.04

[56] References Cited

U.S. PATENT DOCUMENTS

| | | | |
|---|---|---|---|
| 2,354,018 | 7/1944 | Heltzer et al. | 88/82 |
| 2,963,378 | 12/1960 | Palmquist | 106/193 |
| 3,036,928 | 5/1962 | Poole | 117/33 |
| 3,099,637 | 7/1963 | Nellessen | 260/40 |
| 3,228,897 | 1/1966 | Nellessen | 260/16 |
| 3,247,153 | 4/1966 | de Vries | 260/29.6 |
| 3,420,597 | 1/1969 | Nellessen et al. | 350/105 |
| 3,446,762 | 5/1969 | Lopez et al. | 260/18 |
| 3,535,019 | 10/1970 | Longlet et al. | 350/105 |
| 3,835,087 | 9/1974 | Searight et al. | 260/33.6 R |
| 4,004,930 | 1/1977 | Tung | 106/19 |
| 4,068,922 | 1/1978 | Dotsko | 350/126 |
| 4,265,938 | 5/1981 | Jack et al. | 427/163 |
| 4,312,676 | 1/1982 | Hogseth et al. | 106/189 |
| 4,340,273 | 7/1982 | Jack et al. | 350/105 |
| 4,348,312 | 9/1982 | Tung | 428/144 |
| 4,367,920 | 1/1983 | Tung et al. | 350/105 |
| 5,008,142 | 4/1991 | Wilson et al. | 528/203 |
| 5,169,558 | 12/1992 | Smrt et al. | 252/305 |
| 5,256,721 | 10/1993 | Wilson et al. | 524/539 |

*Primary Examiner*—Edward J. Cain
*Attorney, Agent, or Firm*—Wenderoth, Lind & Ponack

[57] ABSTRACT

The present invention relates to a novel retroreflective coating composition which can be suitably applied to a metal substrate using a conventional coral coating process and apparatus. The retroreflective coating composition provides a retroreflective film upon application by coral coating without additional processing steps. The retroreflective coating composition is comprised of (a) 45 to 60% of a resin binder system and (b) 55 to 40% of reflective transparent glass microspheres having a refractive index of 2.1 to 2.5 and a diameter of 20 to 60 microns. The resin binder system is comprised of a thermosetting ethyl acrylate-styrene copolymer, cross-linking resin, aromatic volatile solvent, anti-gelling stabilizer, colloidal suspending agent, dibasic ester acetate, and cross-linking accelerator, and have a refractive index of 1.5 to 1.9. Hence, the novel retroreflective coating composition can provide a retroreflective article with less manufacturing steps and at a lower cost.

17 Claims, No Drawings

RETROREFLECTIVE COATING COMPOSITION FOR COIL COATING APPLICATION, METHOD FOR APPLICATION, AND ARTICLES PRODUCED THEREFROM

BACKGROUND OF THE INVENTION

1. Field of the Invention

The invention is a novel retroreflective coating composition which can be applied to a metal substrate using a conventional coil coating process and apparatus.

2. Description of Related Art

A wide variety of retroreflective materials are known. Generally, a retroreflective material is a material which is capable of reflecting an incident light beam back in the direction of the light source. Such materials are commonly used to impart retroreflectivity to road signs and automobile license plates.

Many retroreflective materials are produced in the form of a flexible tape or sheet. The tape or sheet is generally adhered to substrate with adhesive. Representative examples of such materials are taught in U.S. Pat. Nos. 2,354,018; 4,265,938; 4,340,273; 4,367,920; 5,008,142; and 5,256,721. These materials have a number of disadvantages, most significantly in that they require complicated preparation steps and that they then require application to the substrate.

Liquid retroreflective coating compositions which can be applied directly to a substrate are preferable from the standpoint of their simplicity of application and reduced manufacturing costs. Of the liquid compositions known in the art, some require additional processing steps to provide the coating with retroreflectivity. See for example U.S. Pat. No. 3,420,597, which teaches a liquid retroreflective coating composition, but this composition suffers from the drawback that it requires post-application etching to impart retroreflectivity. Other liquid retroreflective coating compositions of this type are designed for traffic paint and suffer from the drawbacks that they require either the retroreflective beads to be subsequently applied on the surface of the paint stripe, or they require some amount of post-application abrasion before imparting retroreflectivity.

Further, there are some liquid retroreflective coating compositions known in the art which claim to be retroreflective immediately upon application. See for example U.S. Pat. Nos. 2,963,378; 3,068,928; 3,099,637; 3,228,897; 3,247,153; 3,446,762; 3,535,019 and 4,312,676. Most of such liquid compositions are designed for traffic paint applied by spraying and contain a thermoplastic varnish or alkyd resin base. None of these liquid compositions are suitable for application by coil coating application. Moreover, such compositions are distinctly different from the components of the liquid composition of this invention.

A liquid retroreflective coating composition which can be applied to a substrate by a coil coating apparatus has been long sought after by those skilled in the art. One principal problem in discovering such a composition has been in finding a resin binder system which provides adequate retroreflectivity with reflective microspheres after application. No resin binder system commonly employed for coil coating application is known, at least by the present inventors, to possess the requisite characteristics for this use. Another principal problem has been in finding the appropriate components of the liquid coating composition which will maintain the retroreflective transparent glass microspheres in suspension sufficiently for application by coil coating.

SUMMARY OF THE INVENTION

After extension investigation, the present inventors have surprisingly discovered a retroreflective coating composition which can be suitably applied to a metal substrate using a coil coating process and apparatus. The retroreflective coating composition provides a retroreflective film upon application without additional processing steps, hence the composition can provide a retroreflective article with less manufacturing steps and at a lower cost.

There are considered to be two novel aspects to the invention. A first novel aspect is that the refractive index of all the ingredients of the resin binder system of the composition have been carefully controlled to provide a sufficient degree of retroreflectivity upon application which is suitable for use on road signs, license plates, etc. The resin composition has a low refractive index, about 1.5 to 1.9, preferably 1.5 to 1.6. The beads are selected to have a high refractive index, preferably 2.1 to 2.5. This feature of controlling the refractive index of the resin binder system is not taught or suggested in the prior art.

A second novel aspect of the invention is that the resin binder system has the appropriate properties for application by a coil coating process and apparatus. In particular, the resin binder system is specially formulated so that the glass beads stay in suspension in the resin binder system. The present invention is considered to be the first such liquid reflective coating composition of its kind.

More particularly, the liquid retroreflective coating composition of the invention for coil coating application, comprises:

(a) 45 to 60% of a resin binder system, and
(b) 55 to 40% of reflective transparent glass microspheres having a refractive index of 2.1 to 2.5 and a diameter of 20 to 60 microns, said resin binder system (a) comprising:
(c) thermosetting ethyl acrylate-styrene copolymer,
(d) cross-linking resin,
(e) aromatic volatile solvent,
(f) anti-gelling stabilizer,
(g) colloidal suspending agent,
(h) dibasic ester acetate, and
(i) cross-linking accelerator, wherein the resin binder system has a refractive index of 1.5 to 1.9, and wherein the retroreflective coating composition forms a retroreflective film when applied by coil coating.

The liquid coating composition of the invention will be further described hereinbelow.

DETAILED DESCRIPTION OF THE PREFERRED EMBODIMENT

The resin binder system of the present employs a base resin which is known in the general coating art but is not known for application by coil coating application. The resin is an acrylic thermosetting resin of ethyl acrylate-styrene copolymer having a refractive index of 1.5 to 1.9, preferably 1.5 to 1.6. If the refractive index of the resin is 1.4 or below, the resin tends to yellow after curing which is not suitable for coated articles such as license plates. If the refractive index of the resin is 2.0 or higher, there is not a sufficient difference between the refractive index of the resin and reflective microspheres to provide the coating with retroreflectivity.

More preferably, the copolymer is a thermosetting ethyl acrylate-styrene 70/30 amine crosslinked copolymer, such as Acryloid AT-70 produced by Rohm and Haas (about 52.4% resin solids in high aromatic solvent), or Guardsman 101135. The invention also contemplates a water reducible formulation of the resin.

The cross-linking resin employed in the invention is a conventional one, preferably a melamine cross-linking resin such as Cymel, more preferably Cymel 380.

The aromatic volatile solvent employed in the invention is a conventional one, preferably xylene and SC Aromatic 150, which are well known aromatic solvents in this technical field. The solvent should be domestic, i.e. pure, and not recycled.

The anti-gelling stabilizer is a conventional one, preferably diacetone alcohol.

The colloidal suspending agent is conventional bentonite-like particle, preferably cabasil or mica, such as mica #6. This component is critical to maintaining the reflective beads in suspension.

Another component is a dibasic ester acetate, preferably glycol ether dibasic acetate. This component is added to promote solubility and clarity of the resin composition.

The cross-linking accelerator is any conventional one appropriate for cross-linking the base resin, preferably para-toluenesulfonic acid.

The resin binder system may optionally include additional ingredients, such as a pigment.

All ingredients of the resin binder system are selected to provide the resulting composition with a refractive index of 1.5 to 1.9, preferably 1.5 to 1.6. This feature is critical to achieving the retroreflectivity of the composition of the invention and is not taught or suggested in the art.

The reflective transparent glass microspheres or beads employed in the invention may be any conventional type, so long as they have a suitable refractive index, preferably between 2.1 to 2.5, and a diameter of 20 to 60 microns. The diameter and refractive index of the beads is critical to the composition. If the diameter of the beads is less than 20 microns, they act as a flattener and do not impart sufficient retroreflectivity. If the bead diameter is larger than 60 microns, they are too large for coil coating application. Moreover, if the beads have a lower refractive index, they do not impart sufficient retroreflectivity to the composition upon application for use on road signs, license plates, etc. Beads having a higher refractive index are available and might be used in the invention, however there are not any reflective beads known by the inventors, or at least commercially available, having a refractive index over 2.5 which have a diameter of 60 microns or less. Beads manufactured by Flexolite such as 44 micron glass beads satisfying the foregoing requirements are preferred.

After formulation, the liquid retroreflective coating composition of the invention preferably comprises by weight:

(a) 45 to 60%, preferably about 50%, of a resin binder system, and (b) 55 to 40% preferably about 50%, of reflective transparent glass microspheres having a refractive index of 2.1 to 2.5 and a diameter of 20 to 60 microns.

By the term "about 50%" mentioned herein, at least the range of 47% to 53% is intended to be included.

The resin binder system (a) comprises by weight:

(c) 45 to 60%, preferably 50 to 55%, of an organic volatile solvent solution containing said thermosetting ethyl acrylate-styrene copolymer dissolved therein having a resin solids content of about 50%. The thermosetting ethyl acrylate-styrene copolymer is preferably a thermosetting ethyl acrylate-styrene 70/30 amine crosslinked copolymer.

(d) 20 to 30%, preferably 25 to 26%, cross-linking resin, (e) 8 to 15%, preferably 11 to 12%, aromatic volatile solvent, (f) 1 to 3%, preferably 2%, anti-gelling stabilizer, (g) 1 to 3%, preferably 1 to 2%, colloidal suspending agent, (h) 4 to 9%, preferably 6 to 7%, dibasic ester acetate, and (i) 0.25 to 1%, preferably 0.5%, cross-linking accelerator.

The method for preparing the liquid retroreflective coating composition for coil coating application according to the invention is now described hereinbelow, with reference to the most preferred composition of the invention.

The resin binder system (a) is first prepared. All amounts referred to hereinbelow are parts by weight.

First, blend 52.95% of an organic volatile solvent solution containing the thermosetting ethyl acrylate-styrene 70/30 amine cross-linked copolymer dissolved therein having a resin solids content of about 50% (Guardsman 101135) with a 19.05% a melamine cross-linking resin (Cymel) to clarity. To this blended mixture, add as the aromatic solvent a pre-mixture of 2.11% xylene and 5.64% SC 150. Then, add 6.35% glycol ether dibasic acetate as the dibasic ester acetate, followed by adding 2.02% diacetone alcohol as an anti-gelling stabilizer. Thereupon, add the remainder of the aromatic solvent, 4.01% SC 150, and cross-linking resin, 6.31% Cymel 380. Then, add dropwise 0.46% para-toluenesulfonic acid as the cross-linking accelerator and agitate.

The above liquid composition is mixed for about 15 minutes.

After mixing, take 6.29% of the above liquid composition and add 1.1% cabasil or mica #6 particles. After agitation, this pre-mixture is a gel formulation having the appearance of vaseline. The pre-mixture is added back to the above liquid composition and the total composition is agitated to obtain the resin binder system (a). Incidentally, on the commercial scale used by the inventors, the composition is mixed, blended and agitated using a propeller stirrer.

Just before coil coating application, finally add the reflective transparent glass microspheres having a refractive index of 2.1 to 2.5 and a diameter of 20 to 60 microns to the resin binder system (a) in order to obtain the liquid coating composition of the invention. The beads are added in a weight ratio of 1:1 to the resin binder system. The resulting composition is about 80 to 85% solids by volume inclusive of the beads and resin. Due to the characteristics of the composition, the beads are held in suspension during application.

The resulting composition is applied to a pretreated metal substrate, e.g. aluminum, using a conventional coil coating line. For the pretreatment step, any conventional metal cleaner for coil coating is suitable, e.g. acidic, alkaline, and iron phosphate. As an additional pretreatment, the metal substrate may be treated with a anti-corrosion and conversion coating agent such as a chrome-free fluoro titanic acid solution. Preferably, the pretreatment cleans the metal to ensure good bonding of the composition without etching, as well as provides corrosion resistance.

The retroreflective coating composition of the invention is applied by roller coating at a thickness of 4 mils, preferably. The composition is cured at a peak metal temperature between 425° to 450° F. for 25 to 30 seconds. A retroreflective coated metal substrate is thus produced.

The retroreflective film adhered to the metal substrate thus produced is flexible and immediately retroreflective. To protect the surface for longer life, a second coating of the resin binder system without beads may be optionally applied at a thickness of 2 mils as a finishing layer. Alternatively, the substrate may be optionally finished with a clear lacquer coat. The second coating layer also improves the retroreflectivity of the article when wet. After application of the optional second coat, the coated substrate is again heated to cure.

We claim:

1. A liquid retroreflective coating composition for coil coating application, comprising:
    (a) 45 to 60% of a resin binder system, and
    (b) 55 to 40% of reflective transparent glass microspheres having a refractive index of 2.1 to 2.5 and a diameter of 20 to 60 microns,
said resin binder system (a) comprising:
    (c) thermosetting ethyl acrylate-styrene copolymer,
    (d) cross-linking resin,
    (e) aromatic volatile solvent,
    (f) anti-gelling stabilizer,
    (g) colloidal suspending agent,
    (h) dibasic ester acetate, and
    (i) cross-linking accelerator,
wherein said resin binder system has a refractive index of 1.5 to 1.9, and wherein said retroreflective coating composition forms a retroreflective film when applied by coil coating.

2. The liquid retroreflective coating composition according to claim 1, wherein said thermosetting ethyl acrylate-styrene copolymer is a thermosetting ethyl acrylate-styrene 70/30 amine crosslinked copolymer.

3. The liquid retroreflective coating composition according to claim 1, wherein said cross-linking resin is a melamine cross-linking resin.

4. The liquid retroreflective coating composition according to claim 1, wherein said aromatic volatile solvent is xylene and SC 150.

5. The liquid retroreflective coating composition according to claim 1, wherein said anti-gelling stabilizer is diacetone alcohol.

6. The liquid retroreflective coating composition according to claim 1, wherein said colloidal suspending agent is cabasil or mica.

7. The liquid retroreflective coating composition according to claim 1, wherein said dibasic ester acetate is glycol ether dibasic acetate.

8. The liquid retroreflective coating composition according to claim 1, wherein said cross-linking accelerator is para-toluenesulfonic acid.

9. A liquid retroreflective coating composition according to claim 1, wherein said resin binder system (a) comprises by weight:
    (c) 45 to 60% of an organic volatile solvent solution containing said thermosetting ethyl acrylate-styrene copolymer dissolved therein having a resin solids content of about 50%,
    (d) 20 to 30% cross-linking resin,
    (e) 8 to 15% aromatic volatile solvent,
    (f) 1 to 3% anti-gelling stabilizer,
    (g) 1 to 3% colloidal suspending agent,
    (h) 4 to 9% dibasic ester acetate, and
    (i) 0.25 to 1% cross-linking accelerator.

10. The liquid retroreflective coating composition according to claim 1, comprising:
    (a) about 50% of a resin binder system, and
    (b) about 50% of reflective transparent glass microspheres having a refractive index of 2.1 to 2.5 and a diameter of 20 to 60 microns,
said resin binder system (a) comprising:
    (c) 50 to 55% of an organic volatile solvent solution containing thermosetting ethyl acrylate-styrene 70/30 amine crosslinked copolymer dissolved therein having a resin solids content of about 50%,
    (d) 25 to 26% cross-linking resin,
    (e) 11 to 12% aromatic volatile solvent,
    (f) 2% anti-gelling stabilizer,
    (g) 1 to 2% colloidal suspending agent,
    (h) 6 to 7% dibasic ester acetate, and
    (i) 0.5% cross-linking accelerator.

11. A method for preparing a liquid retroreflective coating composition for coil coating application, which comprises the steps of:
    (a) preparing a resin binder system, wherein all amounts are parts by weight of the total composition, comprising the steps of:

blending 52.95% of an organic volatile solvent solution containing a thermosetting ethyl acrylate-styrene 70/30 amine cross-linked copolymer dissolved therein having a resin solids content of about 50% with a 19.05% a melamine cross-linking resin to clarity, adding a first pre-mixture of 2.11% xylene and 5.64% SC 150, adding 6.35% glycol ether dibasic acetate, adding 2.02% diacetone alcohol, adding 4.01% SC 150, adding 6.31% melamine cross-linking resin, adding dropwise 0.46% para-toluenesulfonic acid under agitation, mixing for about 15 minutes to obtain a second premixture, removing 6.29% of the second premixture, adding thereto 1.1% cabasil or mica, and agitating until gel formation to obtain a third premixture, adding the third premixture back to the second premixture, and agitating to obtain the resin binder system (a), and before a coil coating application, (b) adding reflective transparent glass microspheres having a refractive index of 2.1 to 2.5 and a diameter of 20 to 60 microns to the resin binder system (a) in a ratio of 1:1, thereby obtaining the liquid retroreflective coating composition for coil coating application.

12. A method for applying a retroreflective film to a metal substrate by a continuous coil coating process, which comprises the steps of:

preparing the metal substrate for coil coating application, preparing the liquid retroreflective coating composition according to claim 1, applying the liquid retroreflective coating composition to the metal substrate using a coil coating apparatus in a thickness of about 4 mils, wherein the coating is cured at a peak metal temperature between 425° to 450° F. for 25 to 30 seconds, thereby obtaining the metal substrate coated with the retroreflective film.

13. The method according to claim 12, wherein the metal substrate coated with the retroreflective film is finish coated with a clear lacquer coat or the resin binder system (a) exclusive of the reflective transparent glass microspheres.

14. A retroreflective metal article of manufacture, comprising a metal substrate coated with a retroreflective film produced according to the method of claim 12.

15. A method for applying a retroreflective film to a metal substrate by a continuous coil coating process, which comprises the steps of:

preparing the metal substrate for coil coating application, preparing the liquid retroreflective coating composition according to claim 11, applying the liquid retroreflective coating composition to the metal substrate using a coil coating apparatus in a thickness of about 4 mils, wherein the coating is cured at a peak metal temperature between 425° to 450° F. for 25 to 30 seconds, thereby obtaining the metal substrate coated with the retroreflective film.

16. The method according to claim 15, wherein the metal substrate coated with the retroreflective film is finish coated with a clear lacquer coat or the resin binder system (a) exclusive of the reflective transparent glass microspheres.

17. A retroreflective metal article of manufacture, comprising a metal substrate coated with a retroreflective film produced according to the method of claim 16.

* * * * *